(12) United States Patent
Marchesini et al.

(10) Patent No.: US 8,651,267 B2
(45) Date of Patent: Feb. 18, 2014

(54) CONVEYING SCREW APPARATUS FOR TRANSPORTING LOOSE MATERIAL

(75) Inventors: Vainer Marchesini, San Prospero (IT); Luca Golinelli, San Possidonio (IT)

(73) Assignee: WAM Industriale S.p.A., Modena (IT)

( * ) Notice: Subject to any disclaimer, the term of this patent is extended or adjusted under 35 U.S.C. 154(b) by 309 days.

(21) Appl. No.: 13/057,366

(22) PCT Filed: Aug. 3, 2009

(86) PCT No.: PCT/IB2009/006438
§ 371 (c)(1), (2), (4) Date: Jun. 28, 2011

(87) PCT Pub. No.: WO2010/026453
PCT Pub. Date: Mar. 11, 2010

(65) Prior Publication Data
US 2011/0247920 A1     Oct. 13, 2011

(30) Foreign Application Priority Data
Aug. 4, 2008   (IT) .............................. BO2008A0497

(51) Int. Cl.
*B65G 33/00*     (2006.01)
*B65G 33/24*     (2006.01)

(52) U.S. Cl.
CPC ...................................... *B65G 33/24* (2013.01)
USPC .............................. 198/671; 198/670; 406/60

(58) Field of Classification Search
USPC ............ 198/670, 671; 406/53, 56, 57, 58, 59, 406/60, 61
See application file for complete search history.

(56) References Cited

U.S. PATENT DOCUMENTS

| | | | | | |
|---|---|---|---|---|---|
| 647,354 | A | * | 4/1900 | Anderson | 100/98 R |
| 1,477,824 | A | * | 12/1923 | Grindle | 406/60 |
| 1,545,230 | A | * | 7/1925 | Bernert | 406/60 |
| 2,184,248 | A | * | 12/1939 | Bonotto | 422/273 |
| 2,321,015 | A | * | 6/1943 | Davis | 34/428 |
| 2,489,090 | A | * | 11/1949 | Gurney et al. | 406/60 |
| 3,341,280 | A | * | 9/1967 | Eolkin | 422/31 |
| 3,588,180 | A | * | 6/1971 | Herr | 406/60 |
| 3,600,041 | A | * | 8/1971 | Hirano et al. | 406/60 |
| 4,219,586 | A | * | 8/1980 | Parks, Jr. | 426/647 |
| 4,274,786 | A | * | 6/1981 | Svensson et al. | 414/218 |
| RE33,084 | E | * | 10/1989 | Ranson | 406/50 |
| 5,125,771 | A | * | 6/1992 | Herman et al. | 406/57 |
| 5,239,876 | A | * | 8/1993 | Scheucher et al. | 73/863.83 |
| 2001/0030107 | A1 | | 10/2001 | Simpson | |

FOREIGN PATENT DOCUMENTS

| | | |
|---|---|---|
| DE | 760 558 C | 5/1954 |
| FR | 2798371 A | 3/2001 |
| JP | 2003-210028 A | 7/2003 |
| JP | 2004-065076 A | 3/2004 |

\* cited by examiner

*Primary Examiner* — William R Harp
(74) *Attorney, Agent, or Firm* — Leason Ellis LLP

(57) ABSTRACT

A conveying screw apparatus for transporting loose material. The apparatus includes:—a power unit apt to rotate an Archimedes screw pushing the loose material;—a charging hopper of the loose material in a tubular body containing the Archimedes screw and the loose material; —a feeding channel of the loose material towards a user; —pushing elements of the loose material present in the feeding channel; and —a back flow preventing device, preventing the back flow of pushing air together with loose material; such a device closing, in case, a through hole to the feeding channel. The back flow preventing device includes a shutter, provided with a plate, undergoing the action of a helical spring which, in any opening/closing step of the through hole, is always substantially perpendicular to the feeding first direction of the material in the tubular body.

15 Claims, 5 Drawing Sheets

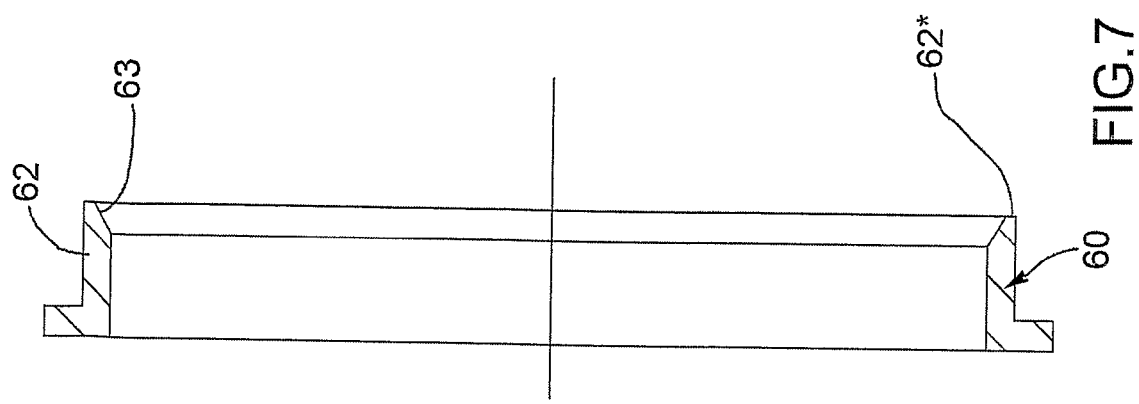
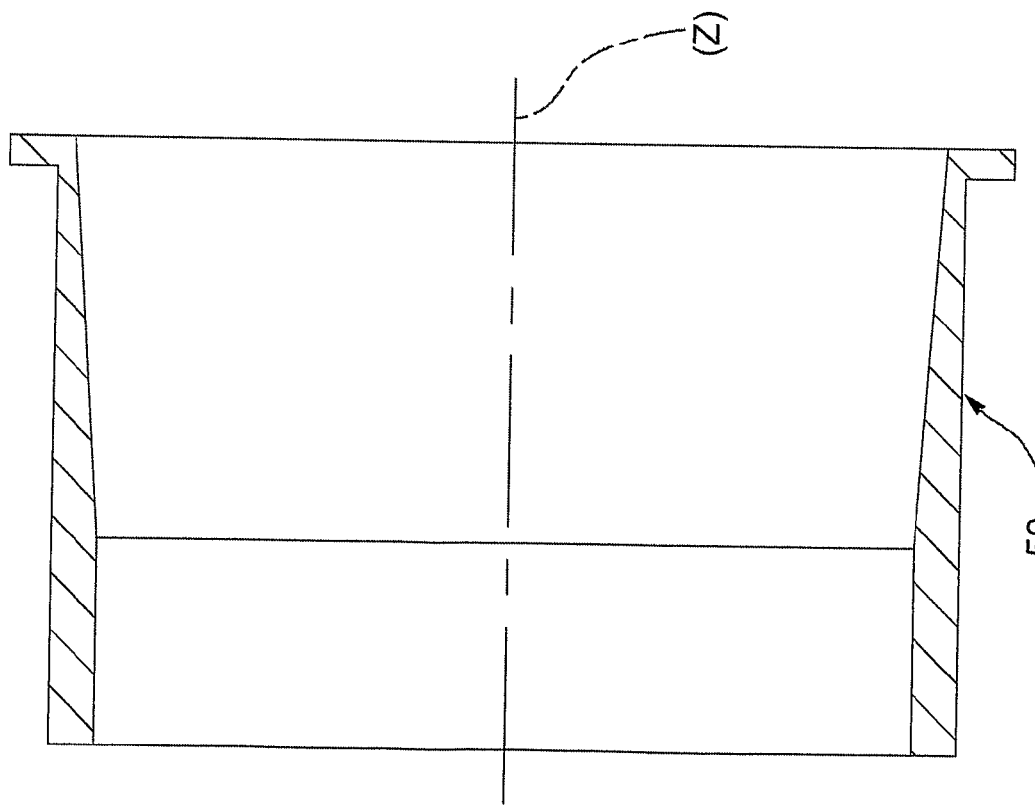

CONVEYING SCREW APPARATUS FOR TRANSPORTING LOOSE MATERIAL

TECHNICAL FIELD

The present invention relates to a conveying screw apparatus for transporting loose material. These conveying screw apparatuses are also known as "powder pumps" in the field.

In particular, the present invention is advantageously, but not exclusively, applied in the transportation of loose materials, such as cement, lime, etc., to which explicit reference will be made in the following description without therefore loosing in generality.

BACKGROUND ART

The conveying screws for transporting loose material currently present on the market comprise:

- a power unit apt to rotate an Archimedes screw pushing the loose material;
- a charging hopper of the loose material in a tubular body containing the Archimedes screw and the loose material for at least a section of its feed path;
- a feeding channel of the loose material towards a user; the feeding channel is connected in series to said tubular body;
- pneumatic pushing elements of the loose material; these pushing elements are present in said feeding channel; and
- a back flow preventing device preventing the back flow of pushing air; such a device occupies a transition zone between the tubular body containing the Archimedes screw and the feeding channel.

This type of conveying screws must be able to continuously charge the loose material falling from the hopper without making the air injected in the form of jet into the feeding channel flow back to the mouth (BC).

Indeed, in the systems currently in use, in order to prevent a portion of the conveying air from reversing the flow and flowing back from the charging mouth of the hopper thus carrying a portion of the loose material outwards, in a manner highly undesirable for users, it has been suggested to exploit the compression of the loose material itself to prevent the releasing of air and powder towards the mouth of the hopper.

In a known solution, a check valve has been adopted to prevent the back-flow of air and powder towards the mouth of the hopper. In this case, a disc is hinged onto a circumferential edge thereof which, due to its weight, closes the through section between the tubular body where the Archimedes screw is contained and the feeding channel.

One of the functional limits of this type of system, however, resides in that for the results to be satisfactory, the powders to be transported must be fine and packable, so that plugs may be formed by reducing the pitch of the Archimedes screw, which plugs follow one another to block the air back flow towards the mouth of the hopper.

Furthermore, transporting abrasive loose products by this system is a further problem because the higher friction with the coils of the Archimedes screw puts at risk the coupling tolerances between the screw itself and the tubular body, and therefore reduces the sealing action exerted by the material present between the coils and the inner wall of the tubular body itself.

In use, once the plug-like material falls into the feeding channel, it is invested by at least one jet of compressed air. Firstly, such a jet breaks up the plug and then impresses the energy needed to feed the powder belonging to the plug towards the end user.

DISCLOSURE OF INVENTION

It is therefore one of the main objects of the present invention to provide a conveying screw apparatus for transporting loose material which is free from the above-described drawbacks while being easy and cost-effective to be implemented.

According to the present invention, a conveying screw apparatus for transporting loose material is thus provided in accordance with the appended claims.

BRIEF DESCRIPTION OF THE DRAWINGS

The present invention will now be described with reference to the accompanying drawings, which illustrate a non-limitative embodiment thereof, in which:

FIG. 6 shows a flanged sleeve used in the apparatus in FIGS. 1, 2; and

FIG. 7 depicts an abutting collar of a plate used in the back flow preventing device shown in FIG. 3.

BEST MODE FOR CARRYING OUT THE INVENTION

Figure 1:
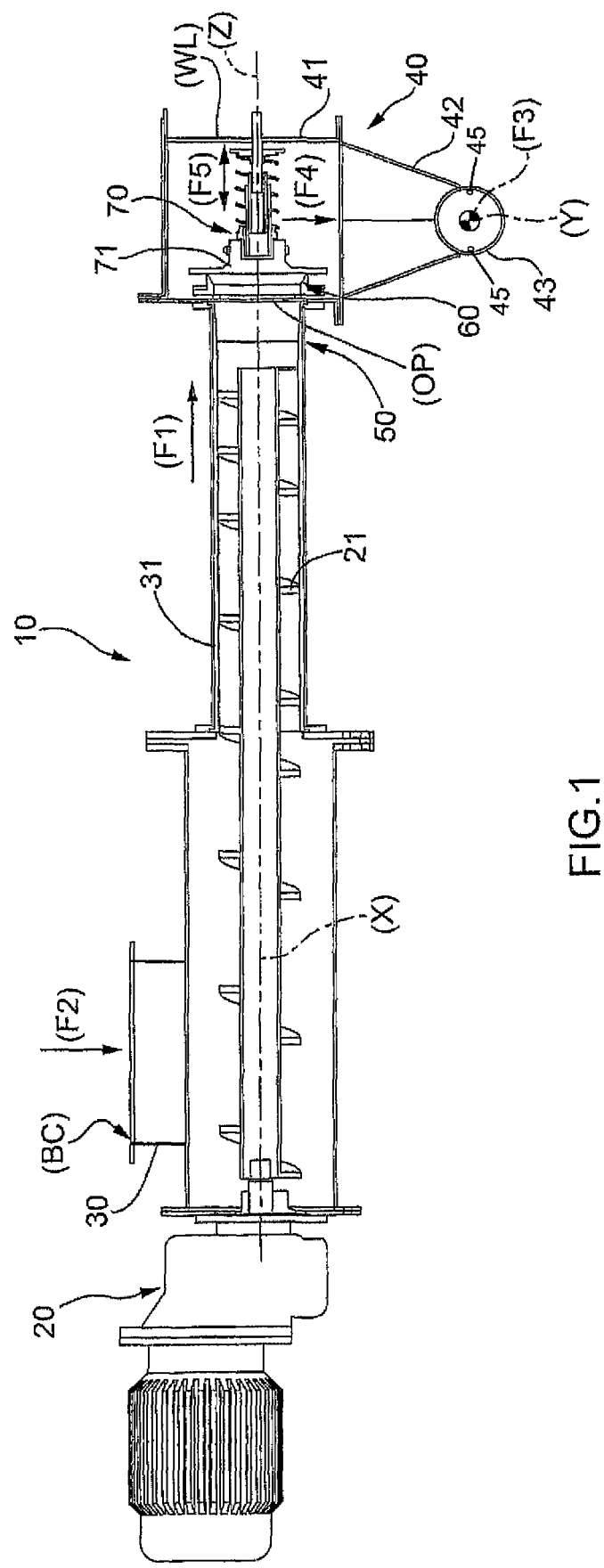
FIG. 1 shows an assembly drawing of the conveying screw apparatus for transporting loose material object of the present invention in a first configuration (closed shutter)
Figure 2:
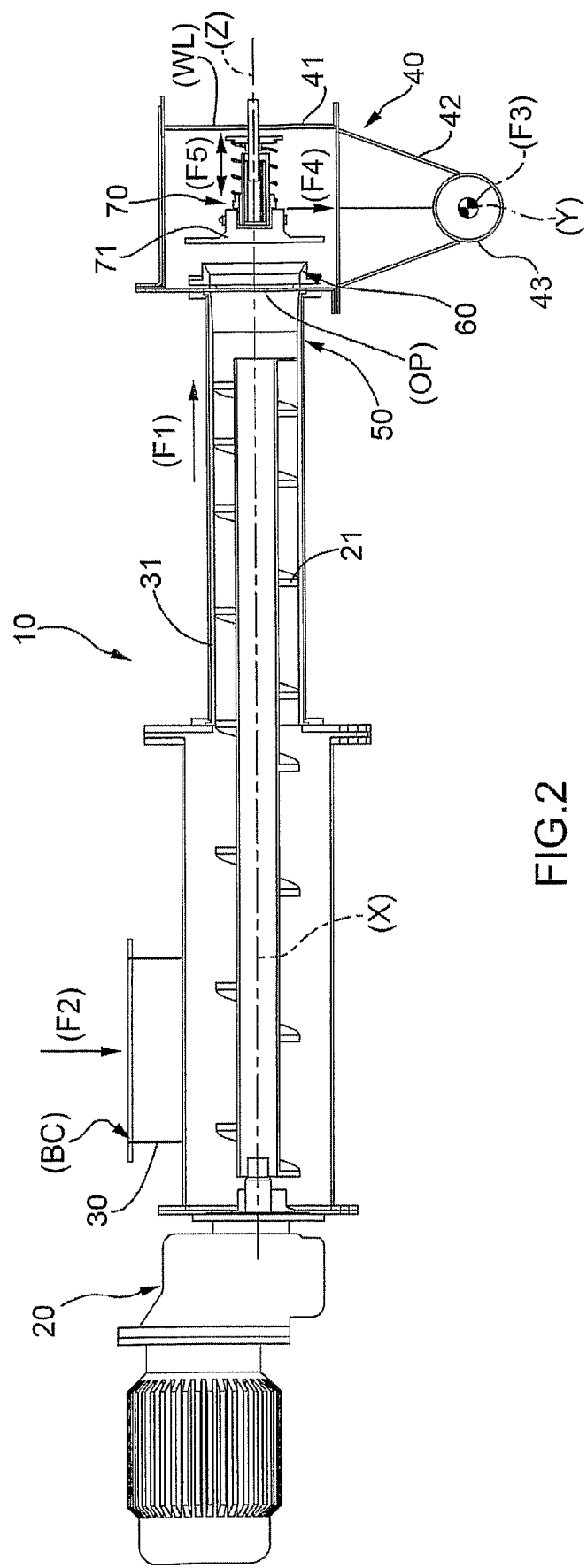
FIG. 2 shows an assembly drawing of the conveying screw apparatus for transporting loose material object of the present invention in a second configuration (open shutter)

In FIGS. 1 and 2, numeral 10 indicates as a whole a conveying screw apparatus for transporting loose material object of the present invention.

Such an apparatus 10 comprises the following devices arranged in series:

- a motoreducer unit 20 apt to rotate an Archimedes screw 21 which feeds the loose material according to a first direction defined by a first arrow (F1) substantially parallel to a rotation axis (X) of the Archimedes screw 21 itself;
- a charging hopper 30 of the loose material (provided with a charging mouth (BC)), in accordance with a second direction defined by a second arrow (F2) substantially perpendicular to the first direction defined by the first arrow (F1), in a tubular body 31 containing the Archimedes screw 21 and the loose material itself for at least one section of its feed path;
- a feeding channel 40 of the loose material towards a user (not shown); the feeding channel 40 is arranged in series to said tubular body 31; and
- pneumatic pushing jets 45 of the loose material present in the feeding channel 40; these jets are oriented along a third direction defined by a third arrow (F3), substantially perpendicular to a fourth direction defined by a fourth arrow (F4) of the material falling from the tubular body 31 into the feeding channel 40 (see below).

The tubular body 31 is advantageously made by using a resin, e.g. polyurethane. Furthermore, the coils of the Archimedes screw 21 may also be advantageously made of polyurethane.

In this case, the tubular body 31 is elastic because made of polyurethane resin and can adapt to the coil of the Archimedes screw 21. The friction reduction between the coil and the inner wall of the tubular body 31 allows to use a machine longer than the current machines and to obtain, in conclusion, the same results with a slower rotation speed of the Archimedes screw 21 than the typical rotation speeds; in the present invention, the drop of the feeding speed of the Archimedes screw occurs by using a speed reducer. Furthermore, 60-70% less powers are used to rotate the Archimedes screw 21 as compared to traditional systems.

Furthermore, minimum and maximum values of the length (L) of the Archimedes screw 21 according to the diameter (D) of the corresponding coil were theoretically calculated in order to have acceptable flow rates of the various loose materials with lower motor powers:

(Lmin)=4 (D)

(Lmax)=6 (D).

These theoretical results were also confirmed by many experiments carried out by the Applicant.

As shown in FIGS. 1, 2, in fact, a coupling sleeve 50 (FIG. 6), also advantageously made of polyurethane, is placed between the tubular body 31 and the feeding channel 40.

Plugs of compressed loose material, which are gradually sent to the feeding channel 40, are formed in the last coils of the Archimedes screw 21, in sleeve 50 and abutting collar 60. These plugs, as will be seen, prevent the back flow of the air towards the environment.

Furthermore, it is worth noting that with reference to FIG. 7, the abutting collar 60 comprises a tubular part 62, which represents the ideal continuation of both the tubular body 31 and the sleeve 50.

For technical reasons which will be better explained below, the tubular part 62 is provided with a sharp circumferential edge 62* apt to break possible blocks of loose material possibly settling on it (see below).

As shown in FIGS. 1 and 2, the flanged sleeve 50 is coupled with the abutting collar 60 sandwiching a wall (WL) of a box-like body 41 therebetween, which is an inlet portion of the mentioned feeding channel 40.

The box-like body 41 obviously includes an opening (OP) in order to allow the loose material passing towards the feeding channel 40.

The feeding channel 40 further comprises a funnel 42 which ends in a pipe 43, the longitudinal symmetry axis (Y) of which is substantially parallel to the third direction defined by the third arrow (F3), while such an axis (Y) is substantially perpendicular to the fourth direction defined by the fourth arrow (F4).

As previously mentioned, the compressed air jets (not shown), which blow the loose material towards a use station 45, are arranged in the pipe 43 with axes substantially parallel to the third direction defined by the third arrow (F3), and thus also parallel to the axis (Y) of the pipe 43 itself.

As shown in greater detail in FIGS. 1, 2, 3, 7, a back flow preventing device (70) is associated with a through hole 63 (having the mentioned circumferential edge 62*), which back flow preventing device prevents the air blown from the jets present in the pipe 43 from flowing back towards the mouth (BC) of the hopper 30, carrying therewith particles of loose material which would thus be dispersed in the external environment with severe damaging consequences for the environment itself and for the operators possibly present close to the charging mouth (BC) of the loose material.

Figure 3:
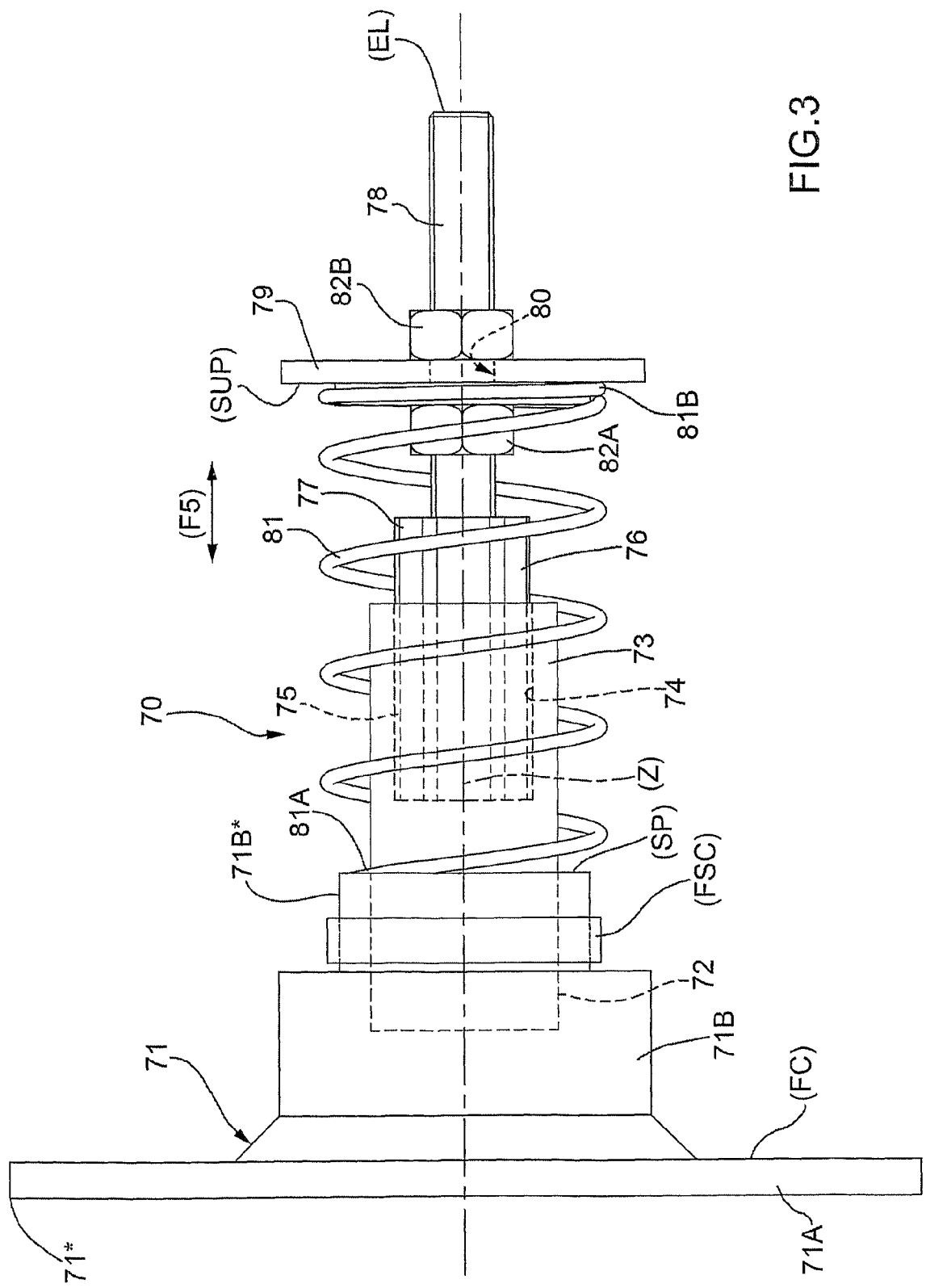
FIG. 3 shows an assembly drawing of a back flow preventing device preventing the back flow of pushing air, which device is used in the apparatus in FIGS. 1, 2.

The constituent elements of the back flow preventing device 70 are depicted in greater detail in FIG. 3.

FIG. 3 shows that the back flow preventing device 70 firstly comprises a disk-like shutter 71 (FIG. 4), advantageously but not necessarily made of resin, e.g. polyurethane.

Incidentally, although the disk-like shutter 71 has been described to be particularly used in the back flow preventing device 70, other equally interesting uses in the field of material transportation are possible. Therefore, the shutter 71 is supposed to operate in different contexts from those described with reference to the accompanying figures.

Shutter 71 comprises in turn a plate 71A with axis (Z) made in one piece with a drilled hub 71B coaxial thereto. The axis (Z), in use, is also the ideal continuation of the mentioned rotation axis (X) of the Archimedes screw 21.

The drilled hub 71B projects from a face (FC) of the plate 71A and has a central blind hole 72 in which a collar 73 of equal diameter is inserted. The collar 73 is made of metal material and is withheld in position in the central blind hole 72 by a clip (FSC) provided with a fastening screw (not shown) which fastens a portion 71B* of the drilled hub 71B onto the collar 73 itself.

A plurality of grooves 75 are provided on the inner surface 74 of the collar 73, which grooves are coupled in use to a corresponding plurality of longitudinal relieves 76 placed on a shaft 77 which, in turn, is integral with a coaxial threaded rod 78. The coupling of the longitudinal relieves 76 with the grooves 75 prevents the rotation of the shaft 77 with respect to the collar 73 but allows the sliding thereof according to two directions defined by a fifth double-headed arrow (F5).

A back flow preventing device 70 further comprises a regulating disk 79 placed on the opposite side of the shutter 71 with respect to the shaft 77.

The regulating disk 79 is provided with a central hole 80 in which the threaded rod 78 is inserted in use (FIG. 3).

There is then a helical spring 81 which, in use, surrounds with its coils the collar 73, the shaft 77 and a portion of the threaded rod 78.

As shown in FIG. 3, in use, a first end 81A of the helical spring 81 rests on a shoulder (SP) formed by the gap comprised between the portion 71B* and the external surface of the collar 73. A second end 81B of the helical spring 81 rests in use on a surface (SUP) of the regulating disk 79.

Furthermore, as shown again in FIG. 3, two nuts 82A, 82B are screwed on the threaded rod 78 on opposite sides with respect to the regulating disk 79. The two nuts 82A, 82B, along with the regulating disk 79, are used to regulate the preload of the helical spring 81 according to their position by axially moving the regulating disk 79 itself in one of the two directions defined by the double-headed arrow (F5) (FIGS. 1, 2).

Furthermore, the free end (EL) of the threaded rod 78 is fixed, by known means (not shown), to the wall (WL) of the box-like body 41.

Due to the particular arrangement of the aforesaid elements, shutter 71 and collar 73 may shift with respect to the shaft 77, the threaded rod 78 integral therewith and the regulating disk 79. The shifting of the shutter 71 obviously occurs in one of the two directions defined by the fifth double-headed arrow (F5).

In other words, in any step of opening/closing of the through hole 63, the shutter 71 undergoing the action of the helical spring 81 always remains substantially perpendicular to the first direction defined by the arrow (F1) of the loose material feeding into the tubular body 31.

In use, the loose material falling from the hopper 30 is pushed by the coils of the Archimedes screw 21 towards the feeding channel 40.

In the last coils of the Archimedes screw, in flanged sleeve 50 and abutting collar 60 a sort of plug is formed, given by the compression of the loose material against the resistance opposed by a frontal face (FF) of the shutter 71 (FIG. 3).

The plug is then pushed against the shutter 71 by the coils of the Archimedes screw 21. When the force exerted by the coils of the Archimedes screw 21 on the plug exceeds the elastic force exerted by the helical spring 81, the shutter 71 moves rightwards (towards a direction defined by the fifth double-headed arrow (F5)), thus opening a substantially cylindrical discharging surface, which takes shape between the circumferential edge 62* of the tubular part 62 and a circumferential edge 71* of the plate 71A (FIGS. 3, 4).

In other words, the material is discharged from the abutting collar 60 towards the feeding channel 40 by means of a sort of "fan" of falling loose material, "fan" which surrounds the whole round angle.

Figure 5:
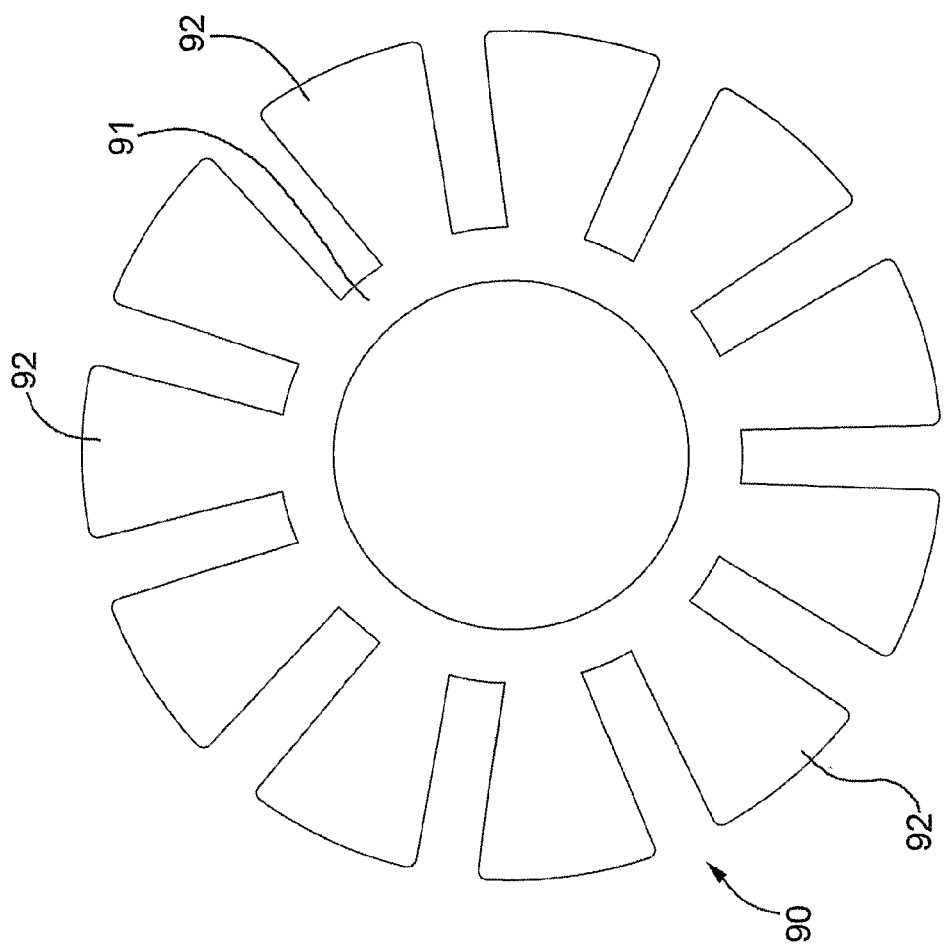
FIG. 5 shows a metal insert incorporated in a portion of the shutter shown in FIG. 4.
Figure 4:
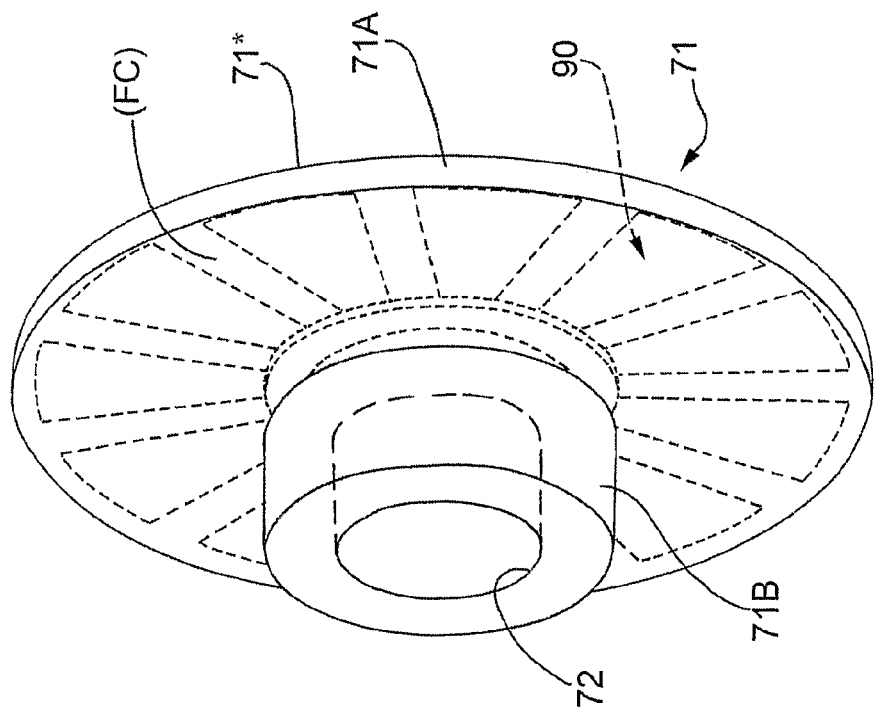
FIG. 4 depicts a shutter belonging to the back flow preventing device shown in FIG. 3.

As shown in greater detail in FIGS. 4, 5, there is a stiffening foil 90 advantageously made of harmonic steel or other material having similar features of robustness and elasticity, in the plate 71A, advantageously made of polyurethane, for example.

Indeed, it is known that a plate 71A which do not include any stiffening elements therein would loose its elasticity and resilience over time due to the natural decay of the mechanical properties of plastic materials.

In the embodiment shown in FIGS. 4, 5, the stiffening foil 90 has a central hole 91, from which a plurality of substantially trapezoidal elements 92 radially extend. In the finished piece, the stiffening foil 90 substantially lays on the same laying plane as the plate 71A, and may be completely wound on both faces by means of the resin of which the plate 71A itself is made.

Such a stiffening foil 90, which essentially is a kind of "Belleville washer", confers features of resilience and elasticity to the plate 71A in which it is embedded, thus making it perfectly compatible with the desired use. Indeed, thereby the plate 71A does not loose over time its elastic properties needed to perfectly close the through hole 63 by resting on the circumferential edge 62* of the tubular part 62 (FIG. 7). As previously mentioned, the circumferential edge 62* is sharp so as to be apt to break possible blocks of loose material deposited thereon. The absence of loose material on the circumferential edge 62* allows a perfect adherence of the plate 71A to the circumferential edge 62* itself, thereby forming an improved sealing which prevents back flows of the air/loose material mixture towards the mouth (BC) of the hopper 30 in the tubular body 31.

The present invention relates also to the following points:
the shutter 71 comprises a plate 71A made a resin, and wherein the plate 71A is provided with a stiffening foil 90 made as a kind of "Belleville washer";
the stiffening foil 90 has a central hole 91 provided with a plurality of radial elements 92;
the elements 92 have a trapezoidal shape;
the stiffening foil 90 in made of harmonic steel and is inserted in a layer of resin, in particular, in a layer of polyurethane resin;
the conveying screw apparatus 10 for transporting loose material comprises;
a power unit 20 apt to rotate an Archimedes screw 21, provided with at least one coil, pushing the loose material; and
a charging hopper 30 of the loose material in a tubular body 31 containing the Archimedes screw 21 and the loose material for at least a section of its path; the loose material being fed according to a direction defined by an arrow (F1) substantially parallel to a rotation axis (X) of the Archimedes screw 21;
wherein
the minimum and maximum values of the length (L) of the Archimedes screw 21, according to the diameter (D) of a corresponding coil, are as follows:
(Lmin)=4 (D)
(Lmax)=6 (D).
the apparatus 10 further foresees a back flow preventing device 70 preventing the back flow of pushing air together with loose material; the device 70 closing, in case, a through hole 63 to the feeding channel 40; wherein the back flow preventing device 70 comprises a shutter 71 provided with a plate 71A, undergoing the action of elastic means 81, 90, which, in any opening/closing step of the through hole 63, is always substantially perpendicular to the first direction defined by the arrow (F1) feeding the material in the tubular body 31.

The main advantage of the conveying screw apparatus for transporting loose material object of the present invention is that the undesired back flow of an air/loose material mixture from the feeding channel to the charging mouth of the hopper is very effectively prevented, thus avoiding harmful dispersions of portions of loose material into the external environment.

The invention claimed is:

1. A conveying screw apparatus (10) for transporting loose material; said apparatus (10) comprises:
an Archimedes screw (21);
a power unit (20) to rotate an Archimedes screw (21) pushing the loose material;
a charging hopper (30) of the loose material in a tubular body (31) containing the Archimedes screw (21) and the loose material for at least a section of its feed path; the loose material being fed according to a first direction substantially parallel to a rotation axis (X) of the Archimedes screw (21);
a feeding channel (40) of the loose material towards a user; the feeding channel (40) being connected in series to said tubular body (31);
pushing elements of the loose material; said pushing elements being placed in said feeding channel (40); and
a back flow preventing device (70), preventing the back flow of pushing air together with loose material; said device closing, in case, a through hole (63) to the feeding channel (40);
wherein said back flow preventing device (70) comprises a shutter (71) provided with a plate (71A), undergoing the action of first and second elastic means (81, 90), which, in any opening/closing step of said through hole (63), is always substantially perpendicular to the first direction feeding the material in said tubular body (31); and wherein in said plate (71A) there is said second elastic means in the form of a stiffening foil (90) made as a kind of "Belleville washer" so as to impart elasticity to said plate (71A); said first elastic means (81) being in the form of a spring that applies a biasing force against said plate (71A).

2. The apparatus (10) according to claim 1 wherein the stiffening foil (90) has a central hole (91) with radially extending elements (92).

3. The apparatus (10) according to claim 2 wherein said elements (92) have a trapezoidal shape.

4. The apparatus (10) according claim 1 wherein said stiffening foil (90) is made of harmonic steel.

5. The apparatus (10) according to claim 1 wherein said through hole (63) is provided with a sharp circumferential edge (62*) apt to break blocks of loose material possibly settling on it.

6. The apparatus (10) according to claim 5 wherein the shutter (71) opens a substantially cylindrical unloading surface formed between said sharp circumferential edge (62*) and a circumferential edge (71*) of said plate (71A).

7. The apparatus (10) according to claim 1 wherein tubular means (50, 60) are placed between said tubular body (31) and said feeding channel (40), inside which plugs produced by the compression of the loose material opposed to the strength of said back flow preventing device (70) are formed.

8. The apparatus (10) according to claim 1 wherein said Archimedes screw (21) and said tubular body (31) are made of a resin.

9. The apparatus (10) according to claim 1 wherein said tubular means (50, 60) are made of a resin.

10. A conveying screw apparatus (10) for transporting loose material; said apparatus (10) comprises:
   an Archimedes screw (21);
   a power unit (20) to rotate an Archimedes screw (21) pushing the loose material;
   a charging hopper (30) of the loose material in a tubular body (31) containing the Archimedes screw (21) and the loose material for at least a section of its feed path; the loose material being fed according to a first direction substantially parallel to a rotation axis (X) of the Archimedes screw (21);
   a feeding channel (40) of the loose material towards a user; the feeding channel (40) being connected in series to said tubular body (31);
   pushing elements of the loose material; said pushing elements being placed in said feeding channel (40); and
   a back flow preventing device (70), preventing the back flow of pushing air together with loose material; said device closing, in case, a through hole (63) to the feeding channel (40);
   wherein said back flow preventing device (70) comprises a shutter (71) provided with a plate (71A), undergoing the action of elastic means (81, 90), which, in any opening/closing step of said through hole (63), is always substantially perpendicular to the first direction feeding the material in said tubular body (31); and wherein in said plate (71A) there is a stiffening foil (90) made as a kind of "Belleville washer", wherein the plate (71A) is integral to and coaxial with a drilled hub (71B) projecting from a side (FC) of the plate (71A) and having a central blind hole (72).

11. The apparatus (10) according to claim 10 wherein a metal collar (73) is inserted in said central blind hole (72), said collar having the same diameter of said blind hole (72), and being provided with a plurality of grooves (75) which are coupled with a corresponding plurality of longitudinal relieves (76) placed on a shaft (77) which, on its turn, is integral to a coaxial rod (78); the coupling of the longitudinal relieves (76) with the grooves (75) avoids the rotation of shaft (77) with regard to the collar (73) but allows their sliding.

12. A conveying screw apparatus (10) for transporting loose material; said apparatus (10) comprises:
   an Archimedes screw (21);
   a power unit (20) to rotate an Archimedes screw (21) pushing the loose material;
   a charging hopper (30) of the loose material in a tubular body (31) containing the Archimedes screw (21) and the loose material for at least a section of its feed path; the loose material being fed according to a first direction substantially parallel to a rotation axis (X) of the Archimedes screw (21);
   a feeding channel (40) of the loose material towards a user; the feeding channel (40) being connected in series to said tubular body (31);
   pushing elements of the loose material; said pushing elements being placed in said feeding channel (40); and
   a back flow preventing device (70), preventing the back flow of pushing air together with loose material; said device closing, in case, a through hole (63) to the feeding channel (40);
   wherein said back flow preventing device (70) comprises a shutter (71) provided with a plate (71A), undergoing the action of elastic means (81, 90), which, in any opening/closing step of said through hole (63), is always substantially perpendicular to the first direction feeding the material in said tubular body (31); and wherein in said plate (71A) there is a stiffening foil (90) made as a kind of "Belleville washer", wherein said back flow preventing device (70) further includes a collar (73) coupled to the plate (71A) and a shaft (77) which is coupled to the collar (73) such that the shaft (77) is prevented from rotating relative to the collar (73) but is permitted to slide longitudinally relative to the collar (73), the shaft (77) being integral to a coaxial threaded rod (78), and wherein the back flow preventing device (70) further comprises a regulating disk (79) placed on the side of the shutter (71) opposite to the shaft (77); the regulating disk (79) being provided with a central hole (80) wherein the threaded rod (78) is inserted.

13. The apparatus (10) according to claim 12 wherein the back flow preventing device (70) also comprises a helical spring (81) which surrounds with its coils both the collar (73) and the shaft (77).

14. The apparatus (10) according to claim 12 wherein the plate (71A) is integral to and coaxial with a drilled hub (71B) projecting from a side (FC) of the plate (71A) and having a central blind hole (72), and wherein the back flow preventing device (70) also comprises a helical spring (81) with a first end (81A) which rests on a shoulder (SP) formed by the gap comprised between a portion (71B*) of the drilled hub (71B) and the external surface of the collar (73); a second end (81B) of the helical spring (81) resting on a surface (SUP) of the regulating disk (79).

15. The apparatus (10) according claim 12 wherein regulating means (82A, 82B), together with the regulating disk (79), regulate the pre-load of the helical spring (81) according to their position by axially moving said regulating disk (79).

* * * * *